US010656293B2

(12) United States Patent
Griffin et al.

(10) Patent No.: US 10,656,293 B2
(45) Date of Patent: May 19, 2020

(54) SHIP-TOWED HYDROPHONE VOLUMETRIC ARRAY SYSTEM APPARATUS

(71) Applicants: Sean Robert Griffin, Slidell, LA (US); Bradley Bruce Lingsch, Diamondhead, MS (US)

(72) Inventors: Sean Robert Griffin, Slidell, LA (US); Bradley Bruce Lingsch, Diamondhead, MS (US)

(73) Assignee: Proteus Technologies, Slidell, LA (US)

( * ) Notice: Subject to any disclaimer, the term of this patent is extended or adjusted under 35 U.S.C. 154(b) by 0 days.

(21) Appl. No.: 16/238,806

(22) Filed: Jan. 3, 2019

(65) Prior Publication Data

US 2019/0137637 A1 May 9, 2019

Related U.S. Application Data

(63) Continuation of application No. 15/139,786, filed on Apr. 27, 2016, now Pat. No. 10,209,379.

(51) Int. Cl.
*G01V 1/00* (2006.01)
*G01S 5/18* (2006.01)
*G01S 5/22* (2006.01)
*G01S 19/13* (2010.01)

(52) U.S. Cl.
CPC ............... *G01V 1/001* (2013.01); *G01S 5/18* (2013.01); *G01S 5/22* (2013.01); *G01S 19/13* (2013.01)

(58) Field of Classification Search
CPC ........ G01V 1/001; G01V 1/201; G01V 1/186; G01S 5/22; G01S 5/18; G01S 19/13
See application file for complete search history.

(56) References Cited

U.S. PATENT DOCUMENTS

| 1,378,960 A * | 5/1921 | Horton | G01S 1/72 367/130 |
| 1,482,980 A * | 2/1924 | Fay | G01S 1/72 367/173 |
| 2,969,036 A * | 1/1961 | Brown | B63G 7/04 114/244 |
| 3,476,208 A * | 11/1969 | Sellman | F41J 5/06 181/145 |
| 5,058,082 A * | 10/1991 | Bertheas | G01V 1/201 367/12 |
| 10,088,584 B2 * | 10/2018 | Griffin | G01V 1/201 |
| 10,209,379 B2 * | 2/2019 | Griffin | G01S 5/18 |
| 2017/0315247 A1 * | 11/2017 | Griffin | G01V 1/186 |
| 2017/0343687 A1 * | 11/2017 | Griffin | G01S 5/18 |
| 2019/0137637 A1 * | 5/2019 | Griffin | G01S 5/18 |

* cited by examiner

*Primary Examiner* — Daniel Pihulic
(74) *Attorney, Agent, or Firm* — Emily Gordy; Carver, Darden, Koretzky, Tessier, Finn, Blossman & Areaux, LLC (57) ABSTRACT

This invention provides a system apparatus and method for ship-towed deployment of a non-linear volumetric array of hydrophones, allowing line-intersect or line-transect sampling of marine mammal populations through passive acoustic monitoring, enabling unambiguous real-time three-dimensional localization of single sounds received through a low-cost, modular, robust, stable, small, light, neutrally to slightly negatively buoyant volumetric array having low self-noise and low flow noise, that avoids putting high tension on the tow cable and that is compatible with standard hydrophones, instrumentation, cabling, and analytical software.

4 Claims, 8 Drawing Sheets

SHIP-TOWED HYDROPHONE VOLUMETRIC ARRAY SYSTEM APPARATUS

This invention was made with Government support under Contract WC-133R-15-CN-0079 awarded by NOAA. The Government has certain rights in the invention.

BACKGROUND

This invention provides a system apparatus and method for a low-drag ship-towed deployment of a non-linear volumetric array of hydrophones, allowing line-intersect or line-transect sampling of marine mammal populations, where "ship-towed" is defined as any type of vehicle capable of moving the apparatus through the water.

Passive acoustic monitoring (PAM) is the preferred technique for detecting marine mammals, because the marine mammals use low-frequency sounds for their own echo-location and communication, and the passive monitoring does not interrupt nor distort those sounds. The low-frequency sounds are very efficiently transmitted in seawater and travel great distances because the hydroacoustic impedance properties of seawater favor lower frequencies and disfavor higher frequencies.

Fixed-location hydrophones have been used to monitor marine mammals, but cannot monitor the vast amounts of deep-ocean habitat as required. Presently, line arrays of hydrophones, towed one behind the other, are used. In order to obtain useful location information, the line array needs to detect more than a single isolated click in order to obtain enough information to make a triangulation. A massive amount of data from line arrays must be processed and analyzed after the fact in order to derive the location information.

The community organization PAMGUARD has been established to address the fundamental limitations of existing cetacean passive acoustic monitoring (PAM) software capabilities, and continues to develop open-source PAM software for acquiring and analyzing hydroacoustic data related to marine mammals. Any equipment or methods developed for this field should be operable or interoperable with this evolving PAMGUARD software.

Sound will reflect at the interface boundary of materials with differing acoustic impedance. Sound will also attenuate in materials. Hydrophones, when towed in the ocean, need a boundary layer to separate the hydrophone from the water flow or significant flow noise will result. In order to optimize hydrophone measurements in the ocean environment, one should surround the hydrophones with materials having low attenuation and close acoustic impedance matches to seawater.

The towing of a hydrophone array across great distances at a reasonable speed to cover those distances, which is about 10 knots, puts a huge amount of stress on any hydrophone array, whether a line array or otherwise, and on any tow cable used. In order to tow the hydrophone array far enough behind the towing ship to avoid the hydroacoustic noise of the ship, the tow cable needs to be at least 100 meters long, and preferably 300 meters long. Such tow cables, which are integrated with data-transfer cables, are known, and any new equipment or methods should make use of such existing tow cables, if possible. The existing cables can withstand 1000 pounds of tension, and that breaking point could be reached if the towed hydrophone array generated even a few hundred pounds of hydrodynamic drag force.

The monitored sounds are very faint, and can be overwhelmed by turbulence in the vicinity of the hydrophones. Existing practice of the PAM technique suffers from turbulence caused by cable drag and by hydrodynamic drag or turbulent flow around whatever housing is provided for a hydrophone array being towed at 10 knots at the end of a 300 meter tow cable.

Because the PAM technique requires detection of the small differences in the time of a given sound reaching each hydrophone in an array, the latitude, longitude, and depth position of the whole array, plus the position of the individual hydrophone with respect to one another, must be known in order to analyze the data, and preferably should be stable in order to avoid additional complexity in the analysis, and because such instability is likely correlated with hydrodynamic drag, turbulence, self-noise, and strain on the hydrophone array structure and the tow cable.

The advantages of an array of hydrophones arranged in a tetrahedron are known. Each hydrophone is equidistant from each other hydrophone, simplifying the calculations, and the relative position of each hydrophone to the others is fixed. However, a tetrahedron is difficult to tow underwater at the end of a long cable, and any roll, pitch, or yaw in the travel of the hydrophone array will alter the relative position of each hydrophone with respect to the underwater sound source. Any such change of orientation or attitude of the hydrophone array must be captured and accounted for in the analysis of the data. Such changes of orientation or attitude are also likely to correlate with increased hydrodynamic drag, self-noise, and strain on the hydrophone array structure and the tow cable.

There is a need for a small, low cost volumetric array, integrated with PAMGUARD, for the use of the government, military, and universities for marine mammal population studies, mitigation for military and commercial activities in the ocean, and detection and localization of submerged assets such as downed planes, moorings, AUVs or ROVs.

SUMMARY OF THE INVENTION

This invention provides a system apparatus and method for ship-towed deployment of a non-linear volumetric array of hydrophones, allowing line-intersect or line-transect sampling of marine mammal populations through passive acoustic monitoring, enabling unambiguous real-time three-dimensional localization of single sounds received through a low-cost, modular, robust, stable, small, light, neutrally to slightly negatively buoyant volumetric array having low self-noise and low flow noise, that avoids putting high tension on the tow cable and that is compatible with standard hydrophones, instrumentation, cabling, and analytical software.

BRIEF DESCRIPTION OF DRAWINGS

Reference will now be made to the drawings, wherein like parts are designated by like numerals, and wherein.

DETAILED DESCRIPTION OF THE INVENTION

Figure 1:
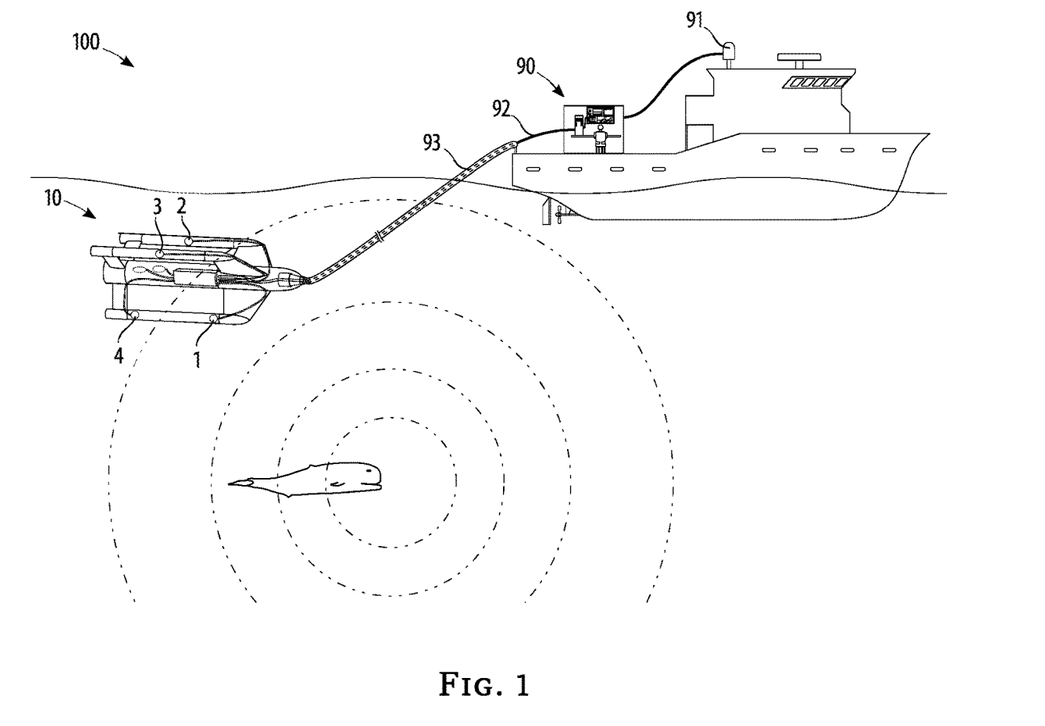
FIG. 1 is a schematic view of the ship-towed hydrophone volumetric array system of the invention in use.

Referring to FIG. 1, the ship-towed hydrophone volumetric array system invention method 100 and apparatus 10 are illustrated schematically. The activity is line-intersect or line-transect sampling of marine mammal populations through passive acoustic monitoring. The water is deep and the area covered is wide, so the underwater sound of the ship and of any equipment used must be minimized in order to be able to pick up the desired signals. The hydrophone volumetric array system is towed behind a ship on a cable about 300 meters in length, in order to get sufficiently far away from the ship's noise. The tow speed is about 10 knots, because so much area must be covered in a single run in order to collect sufficient data.

An underwater sound wave from a single click from a whale propagates through the water and hits each individual hydrophone 1, 2, 3, 4 in the ship-towed hydrophone volumetric array system 10 apparatus at slightly different times correlated with the slight differences in straight-line distances to the sound source. Aboard the towing ship are the topside electronics 90, receiving signals from a GPS antenna 91 and communicating with the hydrophone volumetric array through a multi-channel power and data cable 92 incorporated into or onto the tow cable 93. The topside electronics are able to analyze and display in real time the signals being received from the hydrophone array and the location of the sound source in relation to the hydrophone array, the location of which is known from applying the proper corrections to the GPS data. The result is real-time, three-dimensional location information.

Figure 2:
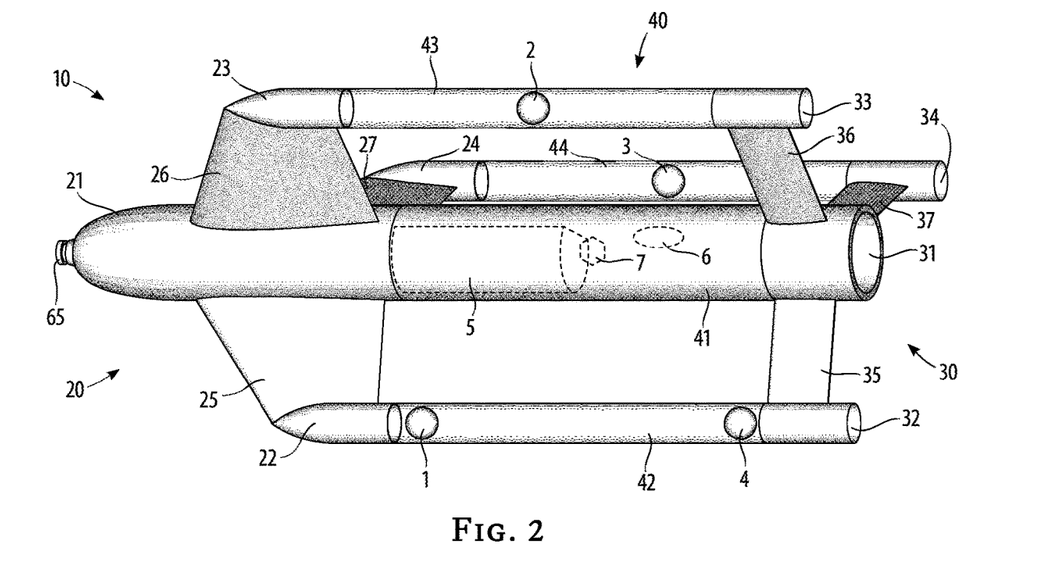
FIG. 2 is an orthographic axonometric view of the ship-towed hydrophone volumetric array system of the invention.

Referring to FIG. 2, the four hydrophones 1, 2, 3, 4 are fixed in a tetrahedral relationship one to the other in the ship-towed hydrophone volumetric array 10 system apparatus. With reference to the direction of travel, there is a fore hydrophone 1, aft hydrophone 4, port hydrophone 2, and starboard hydrophone 3. The four hydrophones generate data that is consolidated and amplified in an electronics housing 5, which also consolidates and amplifies data from a pressure-depth sensor 6 and an orientation sensor 7, and all of the data is sent through the tapered cable clamp 65 through the tow cable and to the topside electronics.

The ship-towed hydrophone volumetric array 10 system apparatus is streamlined to eliminate hydrodynamic drag and to enhance stability as much as possible. Structural components are the fore-structure 20, aft-structure 30, and mid-structure 40. The mid-structure 40 has a main tube housing 41 enclosing the electronics housing 5, pressure-depth sensor 6 and orientation sensor 7. The central axis of the main tube housing 41 passes through the projected center point of the tetrahedron of hydrophones. This central axis is also the axis of the direction of travel of the whole unit. There are three hydrophone tubes 42, 43, 44 arrayed around the main tube housing 41 with 120 degrees separation of one tube to the others, and located at 60 degrees, 180 degrees, and 300 degrees around the central axis of the main tube housing 41. The three hydrophone tubes are the fore-and-aft hydrophone tube 42 located at 180 degrees or directly below the main tube housing in use. The port hydrophone tube 43 and the starboard hydrophone tube 44 are located at 60 degrees and 300 degrees.

The central axis of the main tube housing 41 passes through the projected center point of the tetrahedron of hydrophones, with the consequence that the fore and aft hydrophones 1, 4 and the center point are in a plane along the central axis, and the port and starboard hydrophones 2, 3 and the center point are in a plane perpendicular to the central axis. The distance between the central axis of the main tube housing 41 and the central axis of the fore-and-aft hydrophone tube 42 is therefore one-fifth shorter, or 80% of the corresponding distance for the port and starboard hydrophone tubes 43, 44.

The fore-structure 20 functions as fairing and stabilization of the mid-structure 40 and is attached in smooth continuations of the cylinder and tubes of the mid-structure 40, both as to continuation of the relevant central axes and to continuation of outer surfaces, in order to avoid turbulence and hydrodynamic drag. The fore-structure 20 has a streamlined main nose cone 21 on the main body and three subsidiary nose cones 22, 23, 24 affixed to fore-fins 25, 26, 27 that connect the streamlined main nose cone 21 to the three subsidiary nose cones 22, 23, 24. The nose cones 21, 22, 23, 24 and fore-fins 25, 26, 27 are hollow or partially hollow to provide paths for wiring from the hydrophones to the electronics housing 5, and for lighter weight. The three subsidiary nose cones are the same size and are designated as fore-and-aft nose cone 22, port nose cone 23, and starboard nose cone 24. The three fore-fins are not all of equal length from the main nose cone to the subsidiary nose cone. The fore-and-aft fore-fin 25 is shorter than the port and starboard fore-fins 26, 27, which are of length equal one to the other.

The aft-structure 30 supports and stabilizes the hydrophone tubes 42, 43, 44, and, with the fore-structure 20, stabilizes the ship-towed hydrophone volumetric array system 10 apparatus in use. As with the attachment of the fore-structure 20 and mid-structure 40, the attachment of the mid-structure 40 and aft-structure 30 smoothly continues the relevant central axes and outer surfaces. The aft-structure 30 has a main open aft collar 31 and three subsidiary open aft collars, a fore-and-aft open aft collar 32, a port open aft collar 33, and a starboard open aft collar 34, with each subsidiary open aft collar connected to the main open aft collar 31 by the fore-and-aft aft fin 35, port aft fin 36, and starboard aft fin 37, corresponding to the relevant portions of the fore-structure 20 and mid-structure 40.

The main open aft collar 31 and the three subsidiary open aft collars 32, 33, 34 are all open cylinders or tubes, which allow water to fill all of the mid-structure 40 and the hollow portions of the fore-structure when the invention is in use under water, and to drain out of those structures when the invention is retrieved or handled topside out of the water. It is highly desirable to fill the ship-towed hydrophone volumetric array system 10 with water when in use, because the water continues the transmission of sound to the hydrophones, where air would not and where any hydroacoustically different substance would cause reflection of the sound waves at the boundaries. Also, the smooth, stable operation of the hydrophone array under water requires that the hydrophone array, when in use, has neutral buoyancy or slightly negative buoyancy of five pounds negative plus or minus five pounds. Otherwise, any tendency to float, combined with the natural tendency of the tow cable itself to rise when pulled at significant speeds, is likely to prevent the hydrophone array from staying consistently at the desired depth, which is on the order of ten meters deep. With neutral or slightly negative buoyancy of the hydrophone array, depressor weights only in the amount needed to counteract the effects of cable drag, or to dampen cable strum, will be required, with none to very little depressor weight needed for the hydrophone array. The addition of solid weight to the structure of the hydrophone array, or filling portions with a heavier-than-seawater liquid, would increase the topside weight and would detrimentally dampen the hydroacoustic transparency of the hydrophone array.

The topside or dry weight of a preferred embodiment of the ship-towed hydrophone volumetric array 10, built with the preferred materials and equipped with the preferred equipment, is approximately 30 pounds, and the size is 110 centimeters by 55 centimeters, just over one meter by one-half meter. The size and weight make the ship-towed hydrophone volumetric array 10 easy for one person to handle, deploy, and retrieve.

With the water entering through the open aft collars, abaft the hydrophones, and with no significant water entering through the fore-structure, there is no water actively flowing past the hydrophones inside the hydrophone tubes, but instead there is an envelope of relatively still water in direct contact with the hydrophones. This provides an advantage because the seawater inside the hydrophone tubes has the same hydroacoustic properties as the seawater outside the tubes, but the noisy effects of having the seawater constantly flowing directly over the hydrophones is avoided. The open collars on the aft end do not present any significant hydrodynamic perturbances.

A tapered cable clamp 65 is provided at the center of the tip of the main nose cone 21 for the purposes of towing, low-voltage power, and data communications through data cables incorporated into or onto the tow cable.

Figures 3, 4:
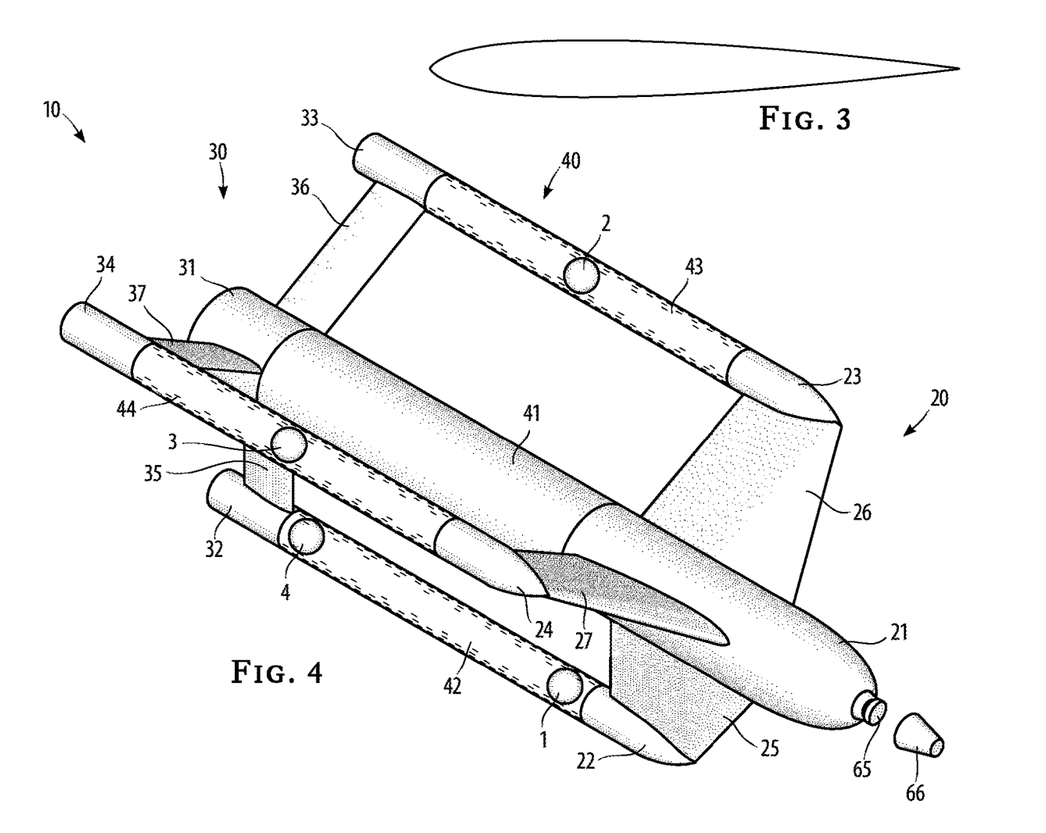
FIG. 3 is a section view of the fin profile of the ship-towed hydrophone volumetric array system of the invention.
FIG. 4 is an orthographic axonometric view of the ship-towed hydrophone volumetric array system of the invention.

Referring to FIG. 3, illustrating the streamlined NACA 0012 wing or fin profile, the cross sectional profile of the fore-fins 25, 26, 27 and aft-fins 35, 36, 37 must be streamlined to promote laminar flow and suppress turbulent flow, in order to avoid the generation of noise at or ahead of the hydrophones, which the hydrophones will subsequently be pulled through. Suppression of turbulence behind the hydrophones is somewhat less critical, but still necessary since any resulting noise travels at much greater speed than 10 knots, and will reach the hydrophones. In a preferred embodiment of the invention, the streamlined fore-fins and aft-fins have the NACA 0012 profile.

Referring to FIG. 4, the ship-towed hydrophone volumetric array 10 system optionally provides a cable-connector fairing boot 66 for the purpose of streamlining or fairing the tow-cable connection and integrating its fairing effect with the fairing effect of the main nose cone 21. The main nose cone 21 has a spherically blunted tangent ogive profile, which minimizes hydrodynamic drag in that area upon which a greater amount of pressure is concentrated. Fairing is provided at the joining of nose cones and fins in the fore-structure 20 and of collars and fins in the aft-structure 30.

Figure 5:
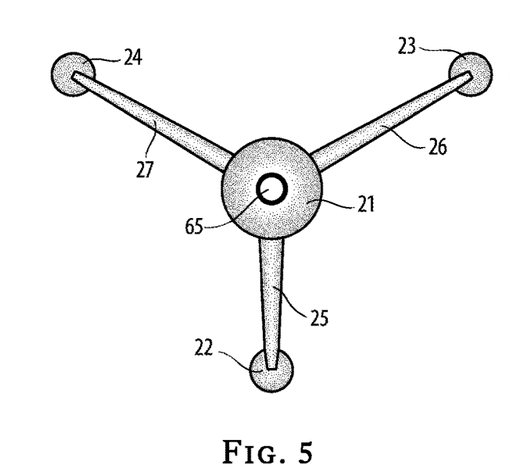
FIG. 5 is a front view of the ship-towed hydrophone volumetric array system of the invention.
Figure 6:
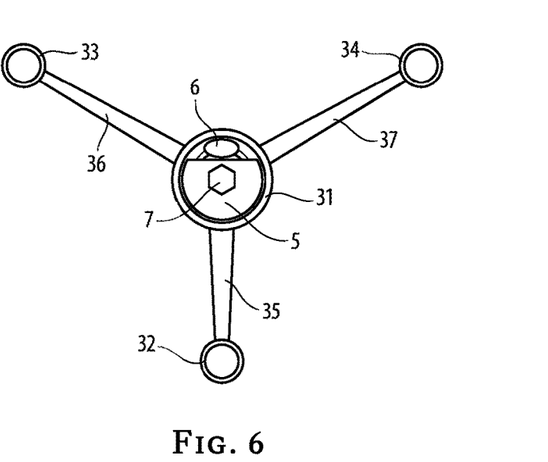
FIG. 6 is a back view of the ship-towed hydrophone volumetric array system of the invention.

Referring additionally to FIG. 5 & FIG. 6, the four hydrophones are supported in a tetrahedral relationship, by definition with equal straight-line distances between any given two hydrophones. In a preferred embodiment of the invention, that distance is 50 centimeters, the equivalent of one-half meter. That distance will figure into the volumetric or three-dimensional analysis of data from the hydrophone array. It has been found to be a sufficient distance for obtaining meaningful and quantifiable differences in the arrival of sound waves. Based on such a 50-centimeter separation, the overall longitudinal length of the central or main portion of the hydrophone array embodiment is 110 centimeters, the diameter of the main tube housing 41 is 6 centimeters, and the diameter of the three subsidiary hydrophone tubes 42, 43, 44 is 5 centimeters each. Measuring from the central axes of each tube, which are parallel each to the others, the distance from the center of the main tube housing 41 to the center of the port tube 43 is 25 centimeters, with the distance to the starboard tube 24 being the same. The distance to the center of the fore-and-aft tube 42 is 20 centimeters, which is 80% of the other distances. A functioning full-scale prototype of the preferred embodiment was built using schedule-80 pipe of 4-inch and 1.5-inch ID size for the main central and the subsidiary tubes.

Figure 7:
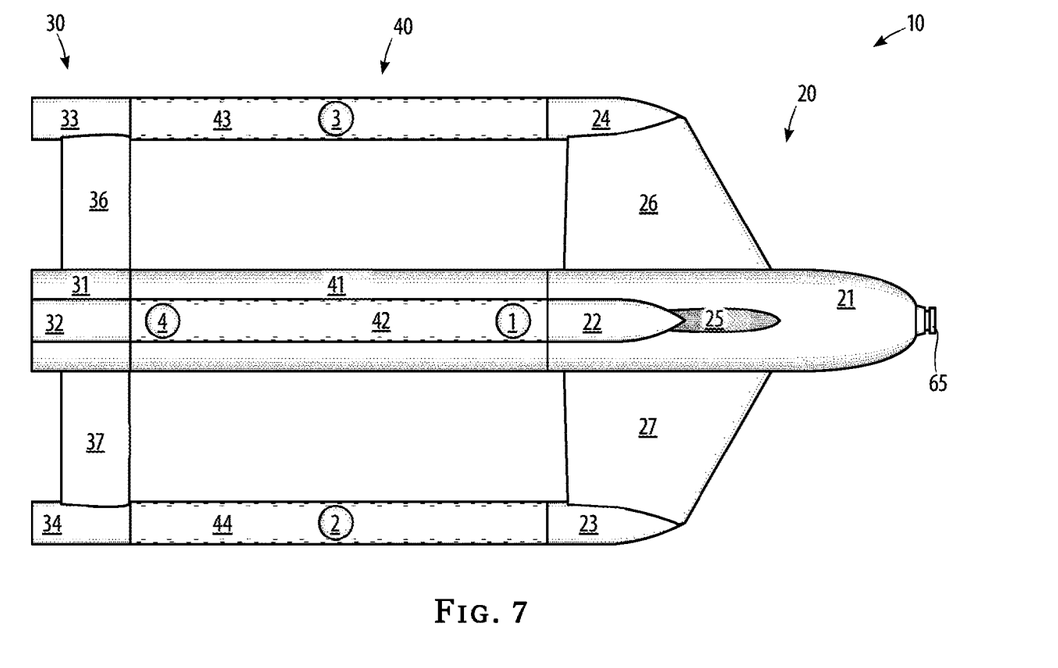
FIG. 7 is a bottom view of the ship-towed hydrophone volumetric array system of the invention.
Figure 8:
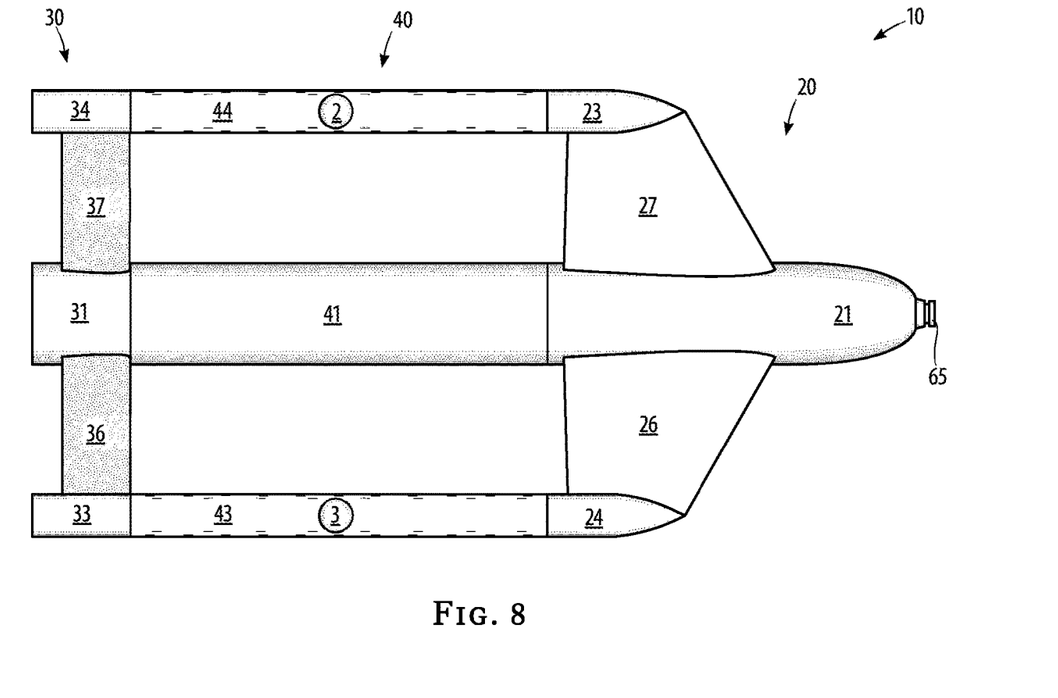
FIG. 8 is a top view of the ship-towed hydrophone volumetric array system of the invention.
Figure 9:
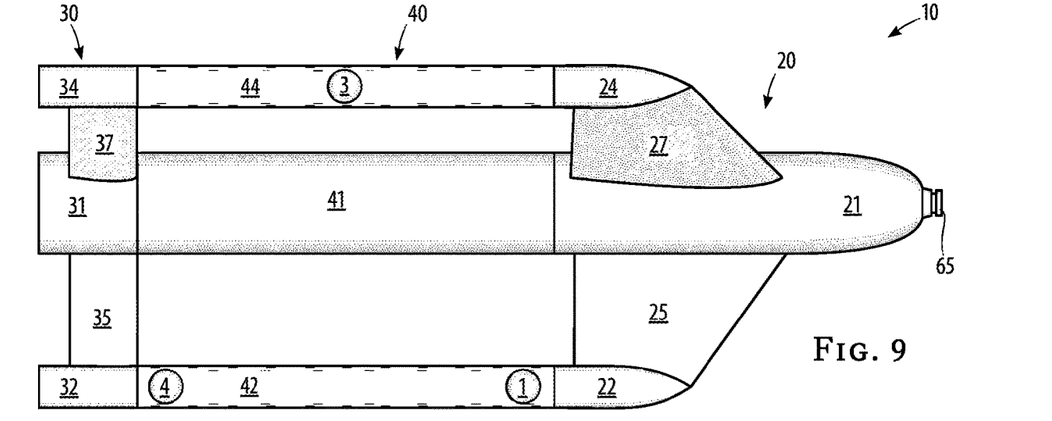
FIG. 9 is a side view of the ship-towed hydrophone volumetric array system of the invention.

Referring to FIG. 7 & FIG. 8, the bilateral symmetry along the central axis in the bottom and top views, and the two-dimensional spatial relationships among the hydrophones, can be seen. Referring to FIG. 9, the asymmetry along the central axis caused by the accommodation of the tetrahedral array in the three-dimensional structure of the ship-towed hydrophone volumetric array system 10 apparatus, and the two-dimensional spacial relationships among the hydrophones can be seen.

Figure 10:
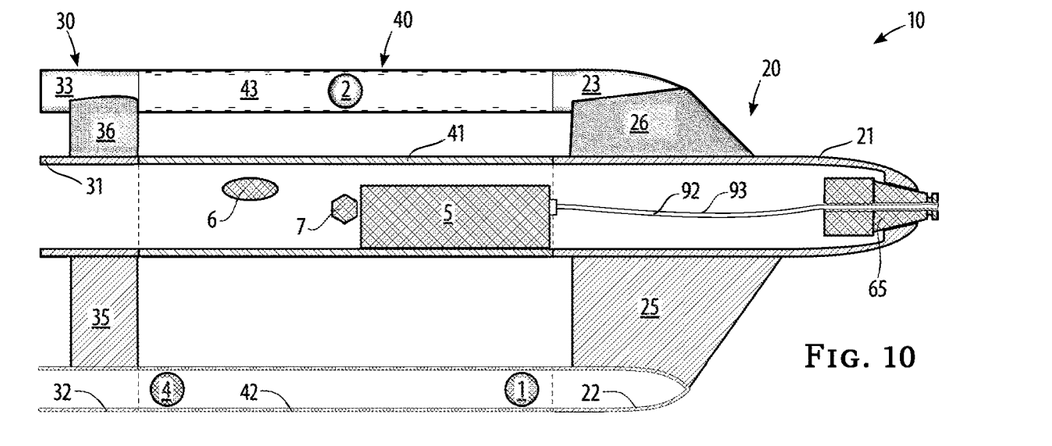
FIG. 10 is a section view of the ship-towed hydrophone volumetric array system of the invention.
Figure 11:
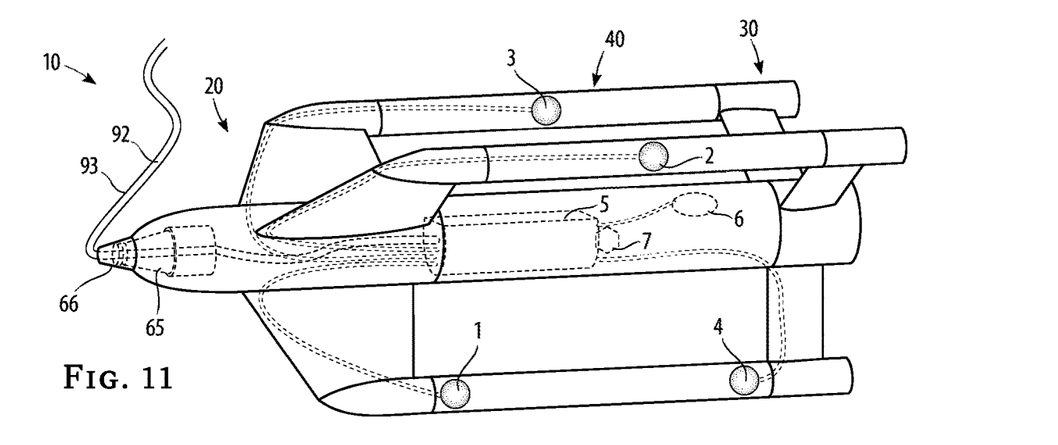
FIG. 11 is a schematic view of the internal components of the ship-towed hydrophone volumetric array system of the invention.

Referring to FIG. 10 & FIG. 11, the tapered cable clamp 65 has a taper corresponding to a taper built into the main nose cone 21. The tapered cable clamp 65 grips the tow cable 93 and incorporated power and data cable 92. The force of the towing tightens the connection because of the taper. The tow cable 93 and incorporated power and data cable 92 is then connected to the electronics housing 5 leaving a small amount of slack in the cable, providing strain relief and a backup cable attachment that can be used for a slow retrieval of the ship-towed hydrophone volumetric array in the event of a failure of the tapered cable clamp. Optionally, a cable-connector fairing boot 66 can be provided to further streamline the assembly.

Appropriate hydrophones are the BENTHOWAVE BII-7094, with a sensitivity of −204 dBV/uPas a capacitance of 13 nF, and the HTI HTI-96-MIN, with a sensitivity of −201 dBV/uPas and a capacitance of 10 nF. Neither of these hydrophones have built-in preamps. The preamps are incorporated in the electronics housing 5, where they can be more easily accessed for adjustment and replacement, if necessary.

In a preferred embodiment, the three subsidiary hydrophone tubes 42, 43, 44 are made from polyvinylidene difluoride (PVDF) tubing. PVDF plastics are heavier than water but hydroacoustically transparent.

An appropriate material for constructing the fore-structure 20 and aft-structure 30 is FIBRE GLAST 2060 epoxy resin used with a mix of carbon composite and fiberglass cloths for the fairing sections. Many epoxies have similar characteristics to plastics that have good acoustic properties and these materials exhibit high strength-to-weight characteristics.

In a preferred embodiment, the electronics housing 5 is a pressure balanced, Castor-oil filled nylon plastic housing. Castor oil is a close acoustic impedance match to seawater, and is an environmentally safe oil that is readily available. The electronics housing 5 can be milled from black 6/6 nylon rod, and an acrylic cover can be machined from 0.5" acrylic sheet.

Four two-stage preamplifiers, one for each hydrophone, are provided in the electronics housing 5. The two-stage preamps are all differential input and differential output. The first preamplifier stage has a gain of 40 dB, and the second stage has a gain of 21 dB, for a total gain of 61 dB. The 3 dB bandwidth of the preamps is 3.0 kHz to 200 kHz.

Also provided are two linear regulators that accept the +/−12 VDC from the topside batteries and regulates down to the +/−3.0 VDC used in the low noise preamps. 12 VDC power is provided to the pressure-depth sensor 6 and the orientation sensor 7.

A pressure-depth sensor 6 is provided to measure, in real time, the water pressure, from which the depth can be derived. The depth must be known in order to locate the ship-towed volumetric array in three-dimensional space using topside GPS data and knowledge of the length of the tow cable and the direction of movement. Sound travels in water through pressure waves, which the hydrophones can detect. The pressure-depth sensor 6 also provides real-time measurements of the baseline or background pressure in which the hydrophones are operating. An appropriate pressure sensor is the HONEYWELL PX2AS1XX250PACHX, which has a 4-20 mA loop output and a full scale range of 250 psi. It is possible that the ship-towed volumetric hydrophone array 10 could reach this depth and pressure if the vessel ever stops in deep water with the array deployed with a 300 meter cable. This sensor will not be destroyed should this happen.

An orientation sensor 7 measures, in real time, any roll, yaw, or pitch in the ship-towed hydrophone volumetric array's attitude along three axes of acceleration. Precise knowledge of the orientation is necessary in order to know the positioning of the hydrophones each with the others so that meaningful directional locations of sound sources can be calculated. The ship-towed hydrophone volumetric array is designed to be stable and stay in trim while being towed, but some variation in orientation will likely occur and must be measured in real time and factored into the analysis of hydrophone data. The orientation sensor 7 is ideally placed at the projected center point of the tetrahedron formed by the four hydrophones. An appropriate orientation sensor is an IAC-I-03 that provides three axes of acceleration with 4-20 mA loop signaling.

Figure 12:
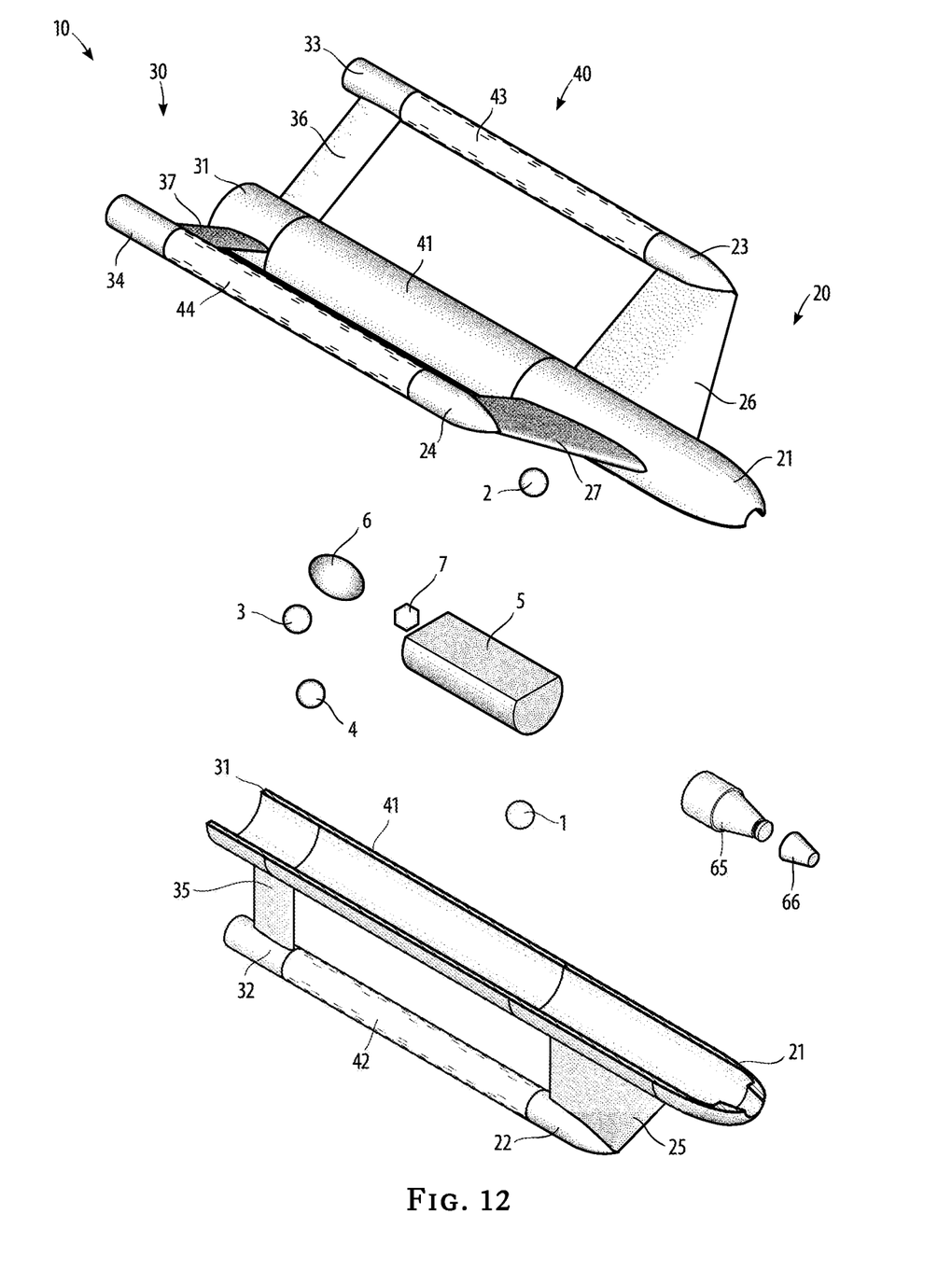
FIG. 12 is an exploded view of the ship-towed hydrophone volumetric array system of the invention.

Referring to FIG. 12, an exploded view further illustrates the internal and external components of the ship-towed volumetric hydrophone array 10 system and their spatial relationships each to the other.

Figure 13:
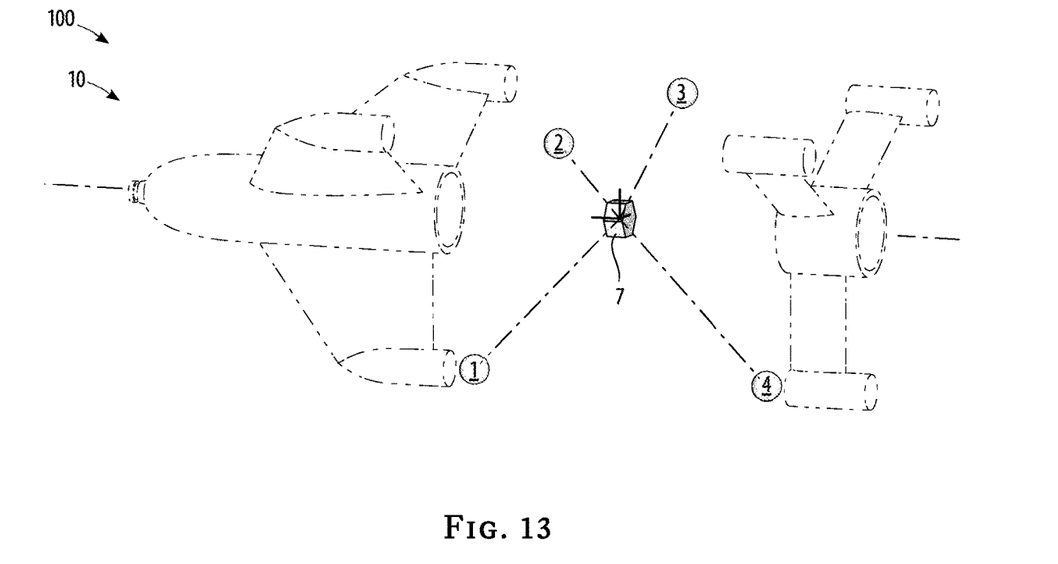
FIG. 13 is a schematic view of the ship-towed hydrophone volumetric array system of the invention in trim.

Referring to FIG. 13, with the ship-towed hydrophone volumetric array 10 traveling in trim, with its central axis or roll axis in line with the direction of travel, the orientation sensor 7 reports zero degrees deviance about all three axes.

Figure 14:
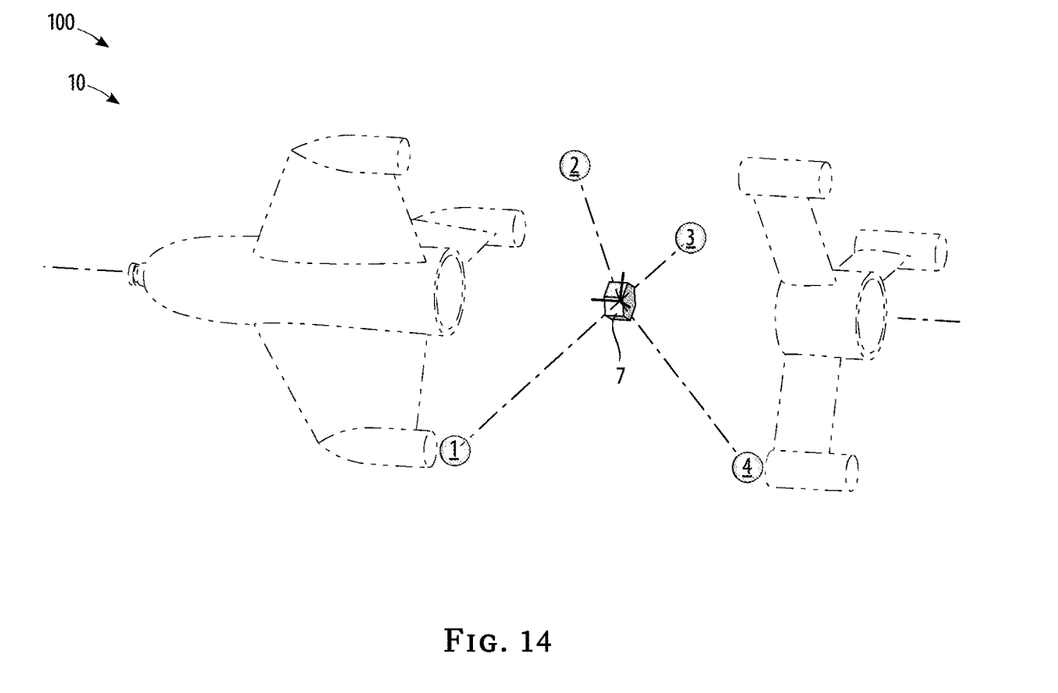
FIG. 14 is a schematic view of the ship-towed hydrophone volumetric array system of the invention rolling.

Referring to FIG. 14, with the ship-towed hydrophone volumetric array 10 rolling, the orientation sensor 7 reports the roll, and the consequential shifting of the hydrophones 1, 2, 3, 4 is available to be accounted for in the analysis of data.

Figure 15:
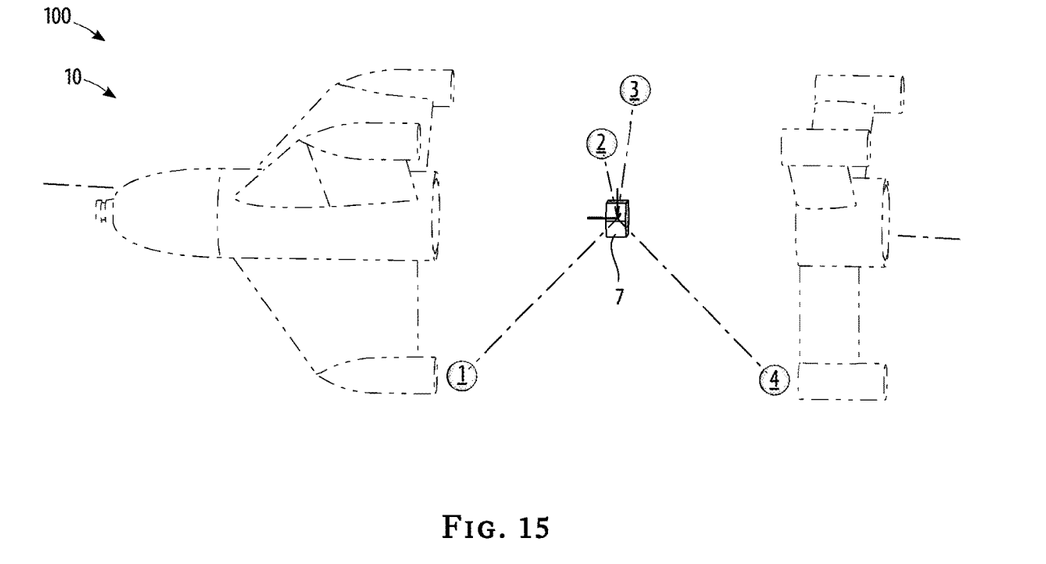
FIG. 15 is a schematic view of the ship-towed hydrophone volumetric array system of the invention yawing.

Referring to FIG. 15, with the ship-towed hydrophone volumetric array 10 yawing, the orientation sensor 7 reports the yaw, and the consequential shifting of the hydrophones 1, 2, 3, 4 is available to be accounted for in the analysis of data.

Figure 16:
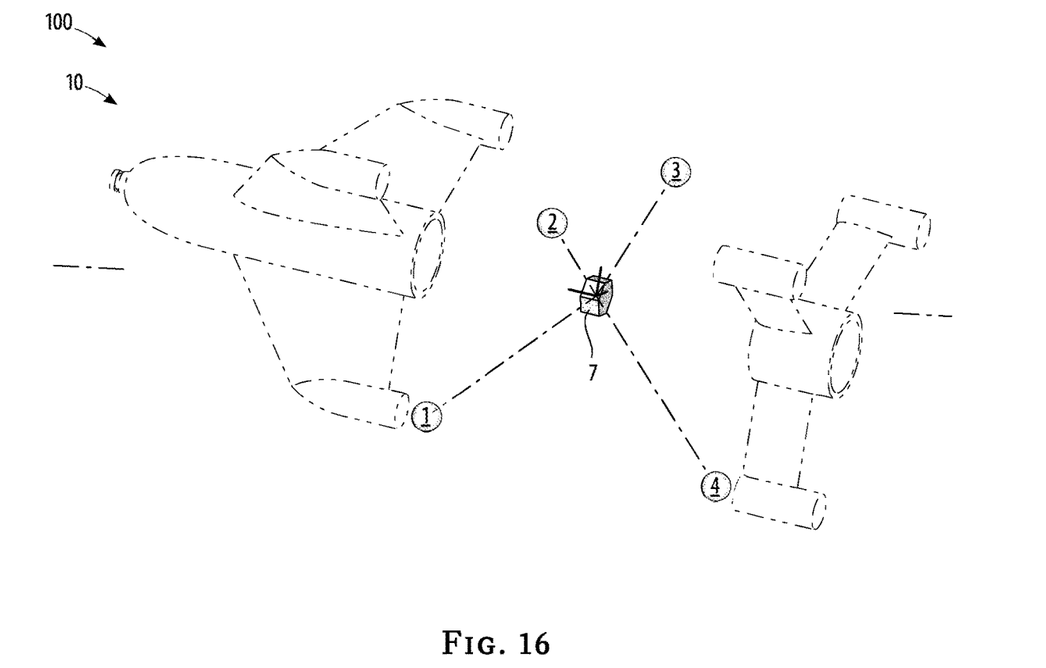
FIG. 16 is a schematic view of the ship-towed hydrophone volumetric array system of the invention pitching.

Referring to FIG. 16, with the ship-towed hydrophone volumetric array 10 pitching, the orientation sensor 7 reports the pitch, and the consequential shifting of the hydrophones 1, 2, 3, 4 is available to be accounted for in the analysis of data.

Figure 17:
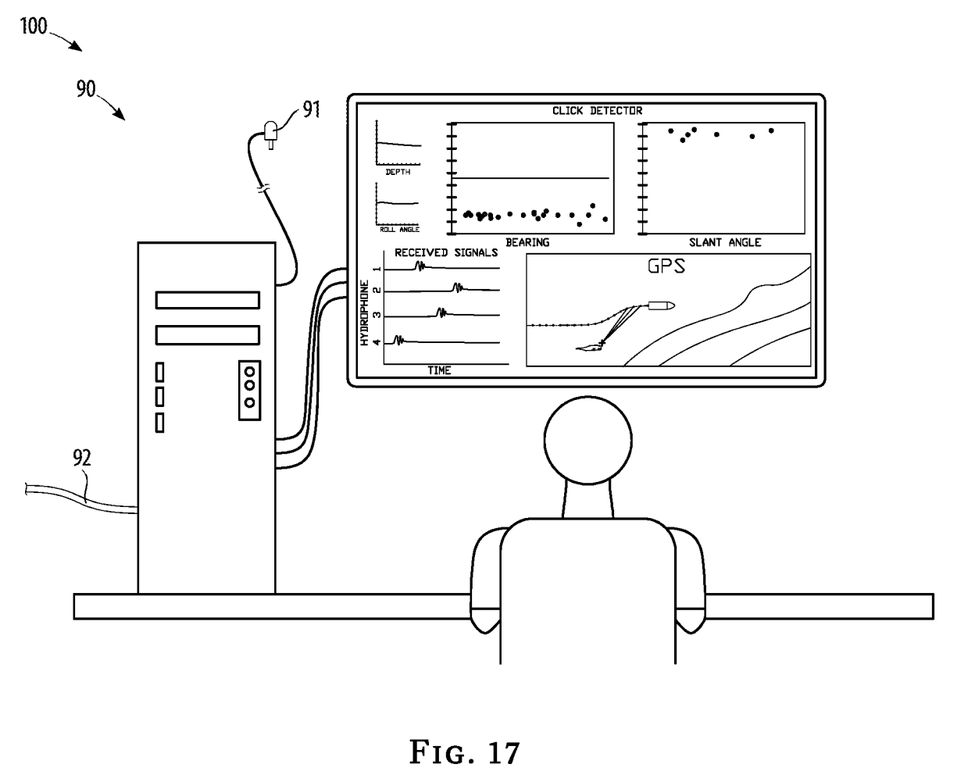
FIG. 17 is a schematic view of the shipboard or topside operation of the ship-towed hydrophone volumetric array system of the invention in use.

Referring to FIG. 17, a schematic view of the topside electronics 90 aboard the towing ship, the system is receiving signals from a GPS antenna 91 and communicating with the hydrophone volumetric array through a multi-channel power and data cable 92. The signals being received from the hydrophone array and the calculated, derived three-dimensional location of the sound source are displayed in real time and are recorded for further analysis and comparisons.

Many changes and modifications can be made in the present invention without departing from the spirit thereof. I therefore pray that rights to the present invention be limited only by the scope of the appended claims.

What claimed is:

1. A ship-towed hydrophone volumetric array, comprising:
   a fore-structure comprising a nose cone;
   a mid-structure attached to said fore-structure opposite said nose cone wherein said mid-structure comprises:
      a main tube housing comprising a central axis,
      a fore-and-aft hydrophone tube wherein said fore-and-aft hydrophone tube is parallel to said main tube housing and connected to said fore-structure by a first fore-fin, and wherein located inside said fore-and-aft hydrophone tube is a fore hydrophone and an aft hydrophone,
      a port hydrophone tube wherein said port hydrophone tube is parallel to said main tube housing and connected to said fore-structure by a second fore-fin, and wherein located inside said port hydrophone tube is a port hydrophone, and
      a starboard hydrophone tube wherein said starboard hydrophone tube is parallel to said main tube housing and connected to said fore-structure by a third fore-fin, and wherein located inside said starboard hydrophone tube is a starboard hydrophone
      wherein said fore hydrophone, said aft hydrophone, said port hydrophone and said starboard hydrophone form points of a tetrahedron shape and said central axis passes through a projected center point of said tetrahedron of hydrophones; and
   an aft-structure attached to said mid-structure opposite said fore-structure wherein said aft-structure comprises a fore-and-aft aft fin, a port aft fin and a starboard aft fin wherein said fore-and-aft aft fin connects said aft-structure to said fore-and-aft hydrophone tube, said port aft fin connects said aft-structure to said port hydrophone tube and said starboard aft fin connects said aft-structure to said starboard hydrophone tube;
   a pressure-depth sensor wherein said pressure-depth sensor is located inside said main tube housing;
   an orientation sensor wherein said orientation sensor is located inside said main tube housing; and a cable clamp located on said nose cone of said fore-structure opposite.

2. The ship-towed hydrophone volumetric array of claim 1 wherein said fore-and-aft hydrophone tube further comprises a first subsidiary nose cone which connects said fore-and-aft hydrophone tube to said first fore-fin, wherein said port hydrophone tube further comprises a second subsidiary nose cone which connects said port hydrophone tube to said second fore-fin and wherein said starboard hydrophone tube further comprises a third subsidiary nose cone which connects said starboard hydrophone tube to said third fore-fin.

3. The ship-towed hydrophone volumetric array of claim 1 wherein said aft-structure further comprises an open aft collar opposite said mid-structure.

4. The ship-towed hydrophone volumetric array of claim 3 wherein said fore-and-aft hydrophone tube further comprises a fore-and-aft open aft collar which connects said fore-and-aft hydrophone tube to said fore-and-aft aft fin, wherein said port hydrophone tube further comprises a port open aft collar which connects said port hydrophone tube to said port aft fin and wherein said starboard hydrophone tube further comprises a starboard open aft collar which connects said starboard hydrophone tube to said starboard aft fin.

* * * * *